United States Patent
Aho et al.

(10) Patent No.: US 9,003,226 B2
(45) Date of Patent: Apr. 7, 2015

(54) CORE FILE LIMITER FOR ABNORMALLY TERMINATING PROCESSES

(71) Applicant: International Business Machines Corporation, Armonk, NY (US)

(72) Inventors: Michael E. Aho, Rochester, MN (US); John E. Attinella, Rochester, MN (US); Thomas M. Gooding, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 13/677,033

(22) Filed: Nov. 14, 2012

(65) Prior Publication Data
US 2014/0136890 A1    May 15, 2014

(51) Int. Cl.
*G06F 11/00*    (2006.01)
*G06F 11/07*    (2006.01)

(52) U.S. Cl.
CPC ........ *G06F 11/0724* (2013.01); *G06F 11/0709* (2013.01); *G06F 11/0781* (2013.01)

(58) Field of Classification Search
CPC ............ G06F 11/0715; G06F 11/0724; G06F 11/0766; G06F 11/0778; G06F 11/0781; G06F 11/0787
USPC ........................ 714/11, 38.11, 47.2
See application file for complete search history.

(56) References Cited

U.S. PATENT DOCUMENTS

| | | | |
|---|---|---|---|
| 6,418,542 B1 * | 7/2002 | Yeager ........................ 714/38.11 |
| 6,643,802 B1 | 11/2003 | Frost et al. |
| 6,675,315 B1 | 1/2004 | Semler et al. |
| 7,496,794 B1 * | 2/2009 | Eastham et al. ................. 714/37 |
| 8,131,973 B2 | 3/2012 | Sugawara |
| 8,245,085 B2 * | 8/2012 | Ueba ............................... 714/45 |
| 8,621,282 B1 * | 12/2013 | Mixter et al. ............... 714/38.11 |
| 2005/0050389 A1 * | 3/2005 | Chaurasia ........................ 714/15 |
| 2008/0229160 A1 * | 9/2008 | Prescott et al. ................. 714/57 |
| 2009/0006800 A1 * | 1/2009 | Bellofatto et al. ............ 711/170 |
| 2009/0216967 A1 * | 8/2009 | Sugawara ..................... 711/156 |
| 2011/0191633 A1 | 8/2011 | Archer et al. |
| 2013/0145218 A1 * | 6/2013 | Laor .......................... 714/38.11 |
| 2014/0136888 A1 | 5/2014 | Aho et al. |

* cited by examiner

*Primary Examiner* — Marc Duncan
(74) *Attorney, Agent, or Firm* — Patterson & Sheridan, LLP (57) ABSTRACT

Computer program product and system to limit core file generation in a massively parallel computing system comprising a plurality of compute nodes each executing at least one task, of a plurality of tasks, by: upon determining that a first task executing on a first compute node has failed, performing an atomic load and increment operation on a core file count; generating a first core file upon determining that the core file count is below a predefined threshold; and not generating the first core file upon determining that the core file count is not below the predefined threshold.

12 Claims, 5 Drawing Sheets

CORE FILE LIMITER FOR ABNORMALLY TERMINATING PROCESSES

BACKGROUND

The present disclosure relates to computer software, and more specifically, to computer software which limits a number of core files generated by abnormally terminating processes in a massively parallel computing system.

SUMMARY

Embodiments disclosed herein provide a computer program product and system to limit core file generation in a massively parallel computing system comprising a plurality of compute nodes each executing at least one task, of a plurality of tasks, by, upon determining that a first task executing on a first compute node has failed, performing an atomic load and increment operation on a core file count; generating a first core file upon determining that the core file count is below a predefined threshold; and not generating the first core file upon determining that the core file count is not below the predefined threshold.

DETAILED DESCRIPTION

Embodiments disclosed herein reduce a number of core files generated by abnormally terminating tasks in a massively parallel computing system. Rather than having each abnormally terminating task generate a core file, embodiments disclosed herein create a sequence number for each abnormally terminating task such that the task may determine where it is ordered in the sequence of all other abnormally terminating tasks. Each task may then determine whether it should generate a core file by comparing its sequence number to a job-defined maximum number of core files generated. If the maximum number of core files has been reached, a core file will not be generated by an abnormally terminating task.

In a massively parallel computing system, many tasks run simultaneously on each of the system's compute nodes. Each task can exit normally, or abnormally. When a task ends abnormally, for example, due to a segmentation violation in the task, a file is generated that contains information regarding the internal state of the task. This file is commonly referred to as a core file. When a task abnormally terminates (or fails), a cascade effect can occur in which many other tasks abnormally terminate due to the original abnormal termination. Additionally, many tasks can encounter the same problem in parallel on many compute nodes, producing core files with the same failure information.

In a small cluster, generating and analyzing core files for hundreds of tasks is manageable. However, as the number of tasks on the system increase, the amount of processing time to generate the core files will increase, as will the amount of network resources used to write the core files to an external, networked file system. The increase in generation time can exceed system-defined maximum wait times allowed for a job to end, resulting in the control system taking more drastic and unnecessary actions to recover from the apparent hang condition. Also, as the number of tasks increases, the storage requirements to contain these core files increase, along with the time needed to analyze the core files. Identification of the first set of tasks to encounter a problem is less obvious when faced with so many core files, leading to extended analysis times to identify the root cause.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
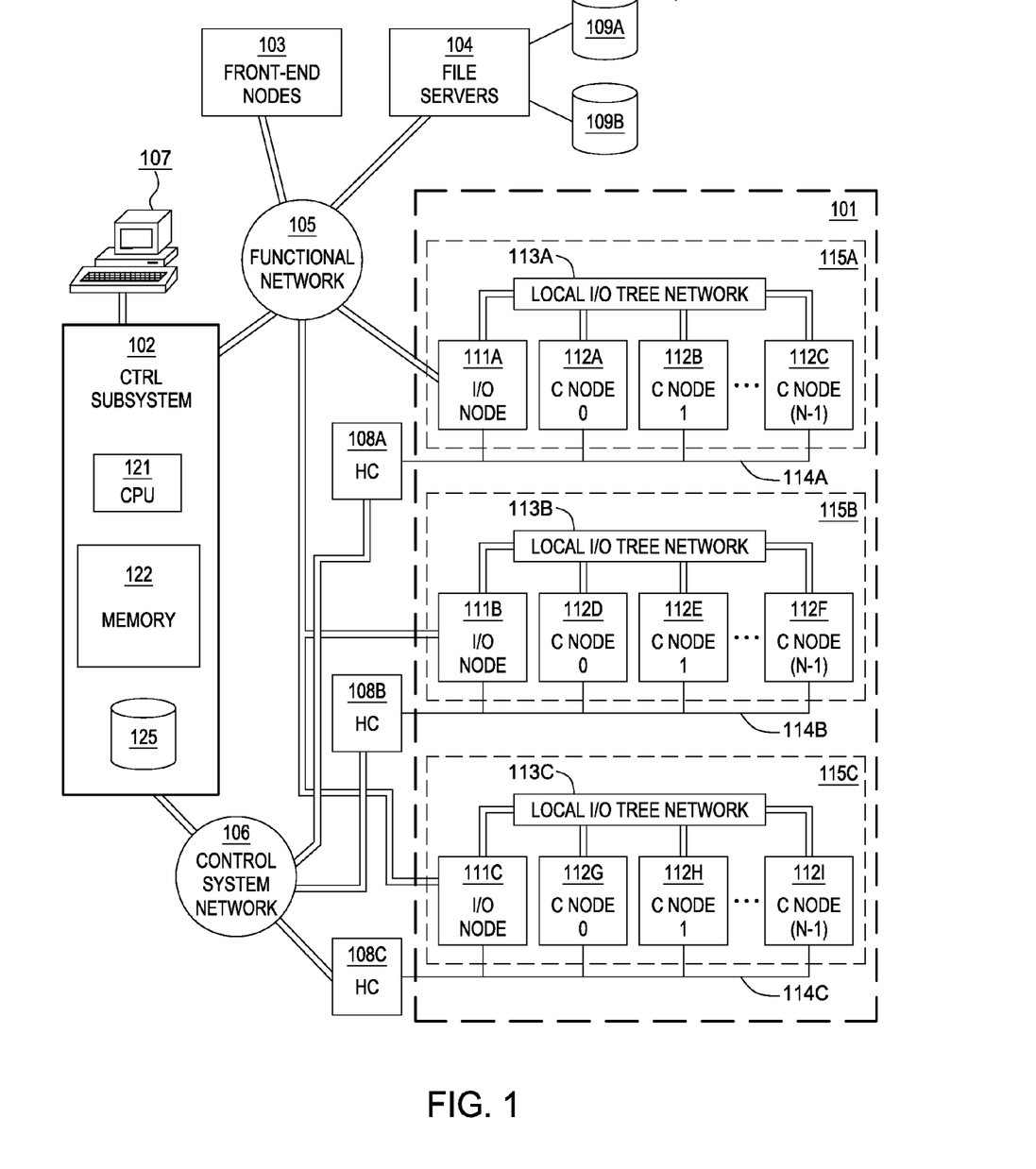
FIG. 1 is a block diagram of components of a massively parallel computer system, according to one embodiment disclosed herein.

FIG. 1 is a block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. As an example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O collective network 113A-C. The I/O nodes, in turn, are connected to functional network 105, over which they communicate with I/O devices attached to file servers 104, or with other system components. Thus, the local I/O collective networks 113 may be viewed logically as extensions of functional network 105, and like functional network 105 are used for data I/O, although they are physically separated from functional network 105. One example of the collective network is a tree network.

Control subsystem 102 directs the operation of the compute nodes 112 in compute core 101. Control subsystem 102 is a computer that includes a processor (or processors) 121, internal memory 122, and local storage 125. An attached console 107 may be used by a system administrator or similar person. Control subsystem 102 may also include an internal database which maintains state information for the compute nodes in core 101, and an application which may be configured to, among other things, control the allocation of hardware in compute core 101, direct the loading of data on compute nodes 111, and perform diagnostic and maintenance functions.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

In one embodiment, the computer system 100 determines, from among a plurality of class route identifiers for each of the compute nodes along a communications path from a source compute node to a target compute node in the network, a class route identifier available for all of the compute nodes along the communications path. The computer system 100 configures network hardware of each compute node along the communications path with routing instructions in dependence upon the available class route identifier and a network topology for the network. The routing instructions for each compute node associate the available class route identifier with the network links between that compute node and each compute node adjacent to that compute node along the communications path. The source compute node transmits a network packet to the target compute node along the communications path, which includes encoding the available class route identifier in a network packet. The network hardware of each compute node along the communications path routes the network packet to the target compute node in dependence upon the routing instructions for the network hardware of each compute node and the available class route identifier encoded in the network packet. As used herein, the source compute node is a compute node attempting to transmit a network packet, while the target compute node is a compute node intended as a final recipient of the network packet.

In one embodiment, a class route identifier is an identifier that specifies a set of routing instructions for use by a compute node in routing a particular network packet in the network. When a compute node receives a network packet, the network hardware of the compute node identifies the class route identifier from the header of the packet and then routes the packet according to the routing instructions associated with that particular class route identifier. Accordingly, by using different class route identifiers, a compute node may route network packets using different sets of routing instructions. The number of class route identifiers that each compute node is capable of utilizing may be finite and may typically depend on the number of bits allocated for storing the class route identifier. An "available" class route identifier is a class route identifier that is not actively utilized by the network hardware of a compute node to route network packets. For example, a compute node may be capable of utilizing sixteen class route identifiers labeled 0-15 but only actively utilize class route identifiers 0 and 1. To deactivate the remaining class route identifiers, the compute node may disassociate each of the available class route identifiers with any routing instructions or maintain a list of the available class route identifiers in memory.

Routing instructions specify the manner in which a compute node routes packets for a particular class route identifier. Using different routing instructions for different class route identifiers, a compute node may route different packets according to different routing instructions. For example, for one class route identifier, a compute node may route packets specifying that class route identifier to a particular adjacent compute node. For another class route identifier, the compute node may route packets specifying that class route identifier to different adjacent compute node. In such a manner, two different routing configurations may exist among the same compute nodes on the same physical network.

Figure 2:
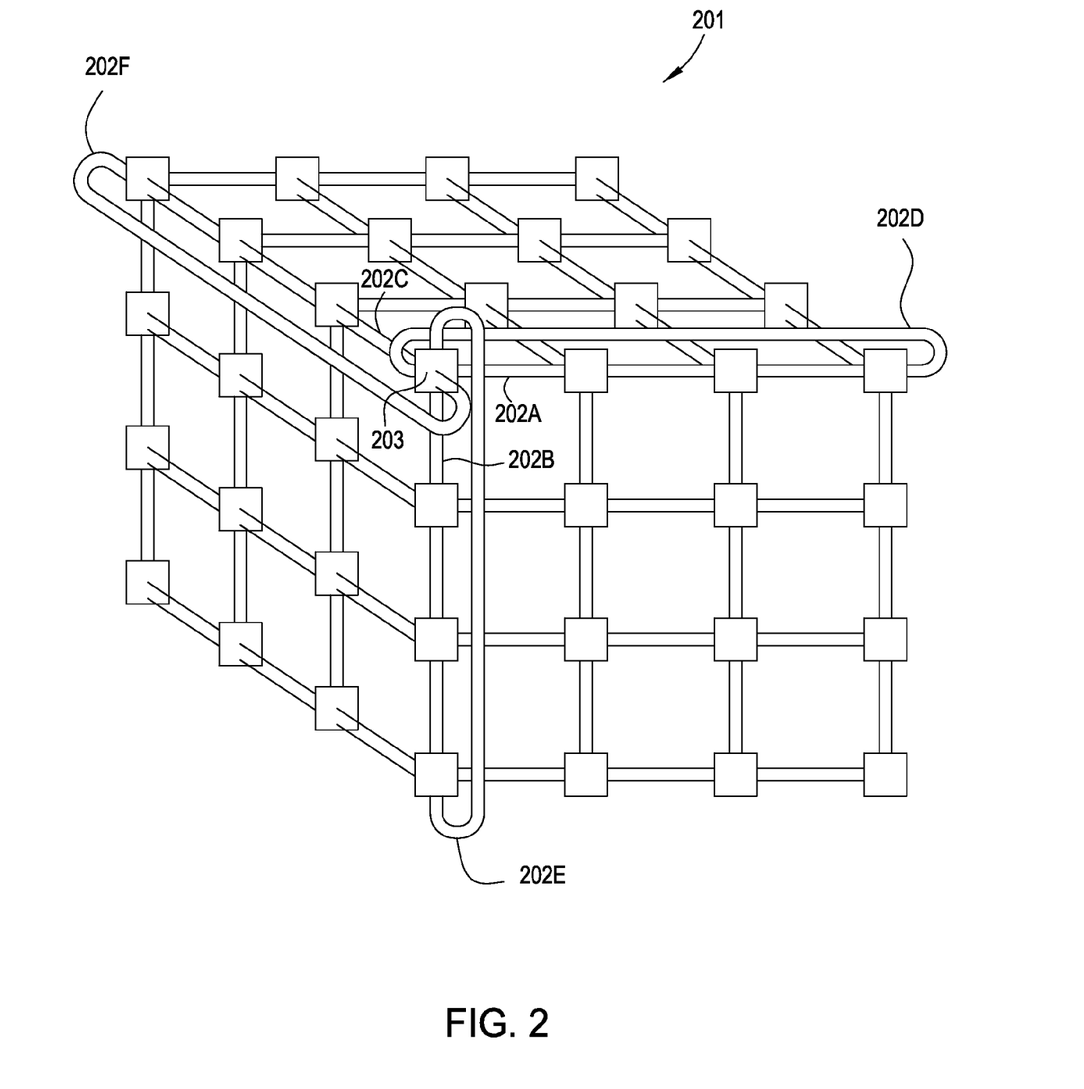
FIG. 2 is a conceptual illustration of a three-dimensional torus network of the system, according to one embodiment disclosed herein.

In one embodiment, compute nodes 112 are arranged logically in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y or z dimensions form a torus in that dimension because the point-to-point communication links logically wrap around. For example, this is represented in FIG. 2 by links 202D, 202E and 202F which wrap around from a last node in the x, y and z dimensions to a first node. Thus, although node 203 appears to be at a "corner" of the torus, node-to-node links 202A-F link node 203 to nodes 202D, 202E and 202F, in the x, y and z dimensions of torus 201.

Figure 3:
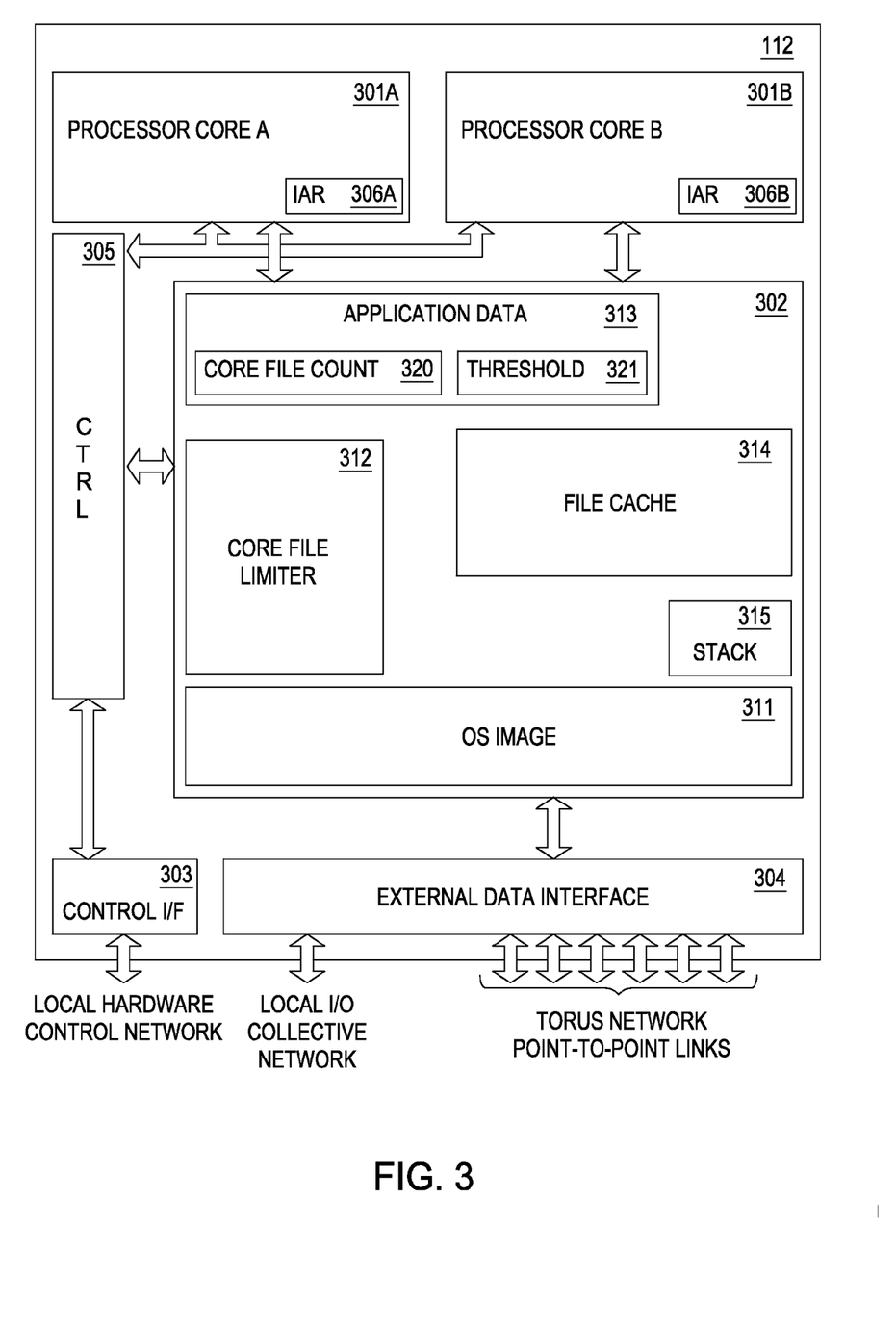
FIG. 3 is a diagram of a compute node of the system, according to one embodiment disclosed herein.

FIG. 3 is a diagram of a compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O collective network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, a core file limiter 312 and user application data structures 313 as required. The user application data structures may include a core file count 320 and a threshold 321. The core file count 320 may store a value indicating a number of tasks, or compute nodes, which have generated core files. The threshold 321 stores a value indicating a maximum number of core files which may be generated by the core file limiter 312. Some portion of memory 302 may be allocated as a file cache 314, i.e., a cache of data read from or to be written to an I/O file. Operating system image 311 provides a copy of a simplified-function operating system running on compute node 112. Operating system image 311 may includes a minimal set of functions required to support operation of the compute node 112. The core file limiter 312 is an application generally configured to limit a number of core files produced by the parallel system 100.

Figure 4:
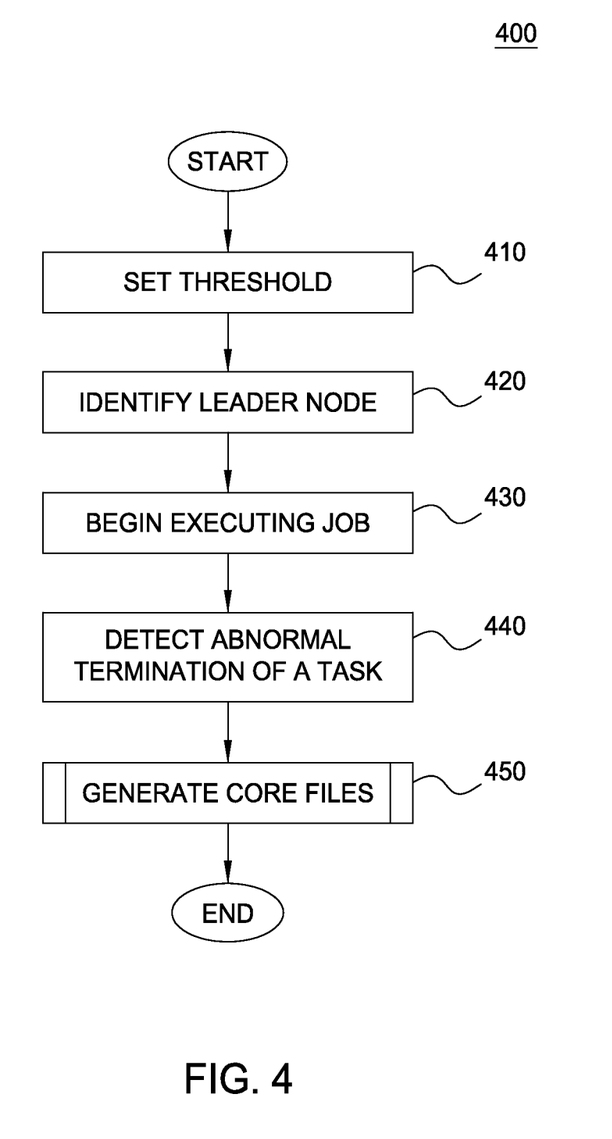
FIG. 4 is a flow chart illustrating a method to limit the number of core files generated by abnormally terminating processes of the system, according to one embodiment disclosed herein.

FIG. 4 is a flow chart illustrating a method 400 to limit the number of core files generated by abnormally terminating processes (tasks) of a massively parallel computing system, according to one embodiment disclosed herein. The steps of the method 400 may be performed by the core file limiter 312. At step 410, the core file limiter 312 sets a threshold 321 for core file generation. The threshold 321 may be defined by a user for a given job, or a default value defined in the core file limiter 312 may be applied. In one embodiment, the threshold 321 defines a maximum number of core files that may be generated during execution of the job. For example, the threshold 321 may indicate that of the 2,000,000 tasks in a job, only 2,048 core files may be created by any abnormally terminating tasks in the job. In such an example, the threshold 321 value would be 2,048. In an alternate embodiment, the threshold 321 may indicate a maximum number of compute nodes generating core files, regardless of the number of tasks executing on the compute nodes which generate core files. In such embodiments, the total number of core files generated may exceed 2,048, but the number of compute nodes generating core files may not exceed 2,048.

At step 420, the core file limiter 312 identifies a leader node for the job, which may be a compute node of the parallel computing system which maintains many of the variables relied upon by the method 400 to limit the generation of core files. The leader node may store the threshold 321 value and maintain a count of core files generated by the task in physical memory, and transmit these values via the network connecting the compute nodes. The leader node may be selected based on any suitable criteria. At step 430, the parallel computing system begins executing a job, which is comprised of a plurality of tasks being executed on the plurality of compute nodes of the parallel computing system. When each compute node receives its task information, the core file limiter 312 may also include the threshold 321 value, such that each compute node may reference the threshold 321 during execution of the tasks. Each task executing in the parallel computing system is also assigned a task rank number which is used to identify the tasks. At step 440, abnormal termination (or failure) of a task is detected in a compute node of the plurality of compute nodes. The abnormal termination may be caused by any number of reasons during the processing of the task. At step 450, described in greater detail with reference to FIG. 5, core files may be generated by abnormally terminating tasks on the parallel computing system.

Figure 5:
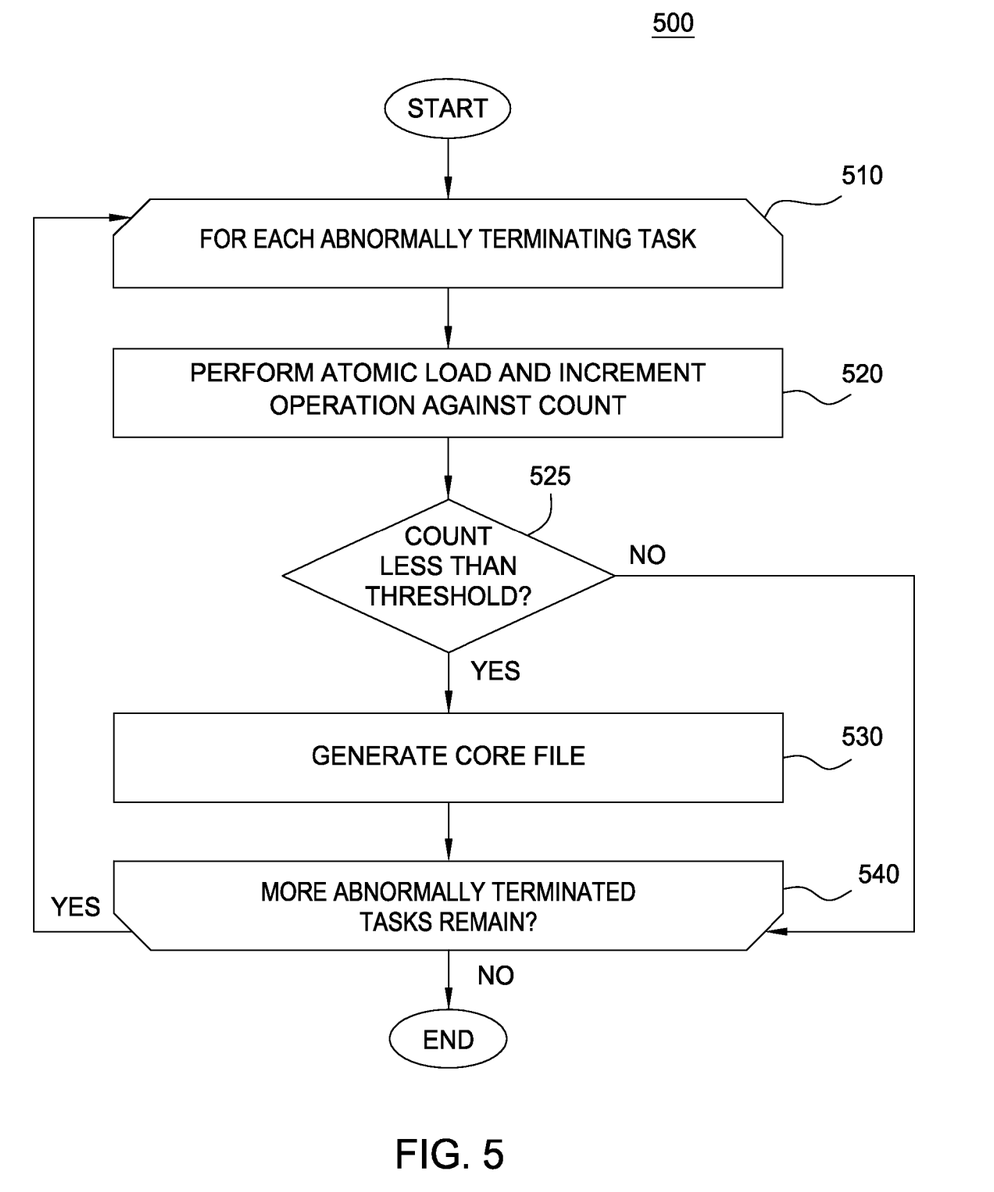
FIG. 5 is a flow chart illustrating a method to generate core files, according to one embodiment disclosed herein.

FIG. 5 is a flow chart illustrating a method 500 corresponding to step 450 to generate core files, according to one embodiment disclosed herein. Generally, the method 500 ensures that the number of core files generated by abnormally terminating tasks (or a number of compute nodes having tasks which generate core files) does not exceed the threshold 321. Each iteration of the method 500 may begin with a newly initialized core file count 320 value. In one embodiment, the core file limiter 312 executes the steps of the method 500. At step 510, the core file limiter 312 begins executing a loop containing steps 520-540 for each abnormally terminating task in the job. For example, task rank number 12,345 of 2,000,000 may be the first task to abnormally terminate in the job, and the failure of task 12,345 causes all other tasks to abnormally terminate. At step 520, the task 12,345 may perform an atomic load and increment operation on the core file count 320 value stored in the leader node, through the network, which, in one embodiment, is the torus 201 of FIG. 2. The atomic load and increment operation is an operation where the core file count 320 value is loaded and incremented by only one task at a time, such that multiple tasks are not simultaneously loading and incrementing the same value. Step 520 may occur before or after all other tasks terminate. Upon requesting the count information from the leader node, the leader node will indicate to the task 12,345, that the count of abnormally terminating tasks is 0, as task 12,345 is the first task to abnormally terminate. The task 12,345 may increment the count to reflect its status as an abnormally terminating task, which is then stored in the memory of the leader node.

At step 520, the task 12,345 determines whether the received core file count 320 value is less than the threshold 321. If the core file count 320 is less than the threshold 321, the method proceeds to step 530. As previously stated, the threshold 321 may have been set at 2,048 core files (or nodes creating core files). Since the core file count 320 received by task 12,345 is less than the threshold 321, the task 12,345 may generate a core file at step 530. Otherwise, a core file is not generated and the method proceeds to step 540. At step 540, the core file limiter 312 determines whether more abnormally terminating tasks remain. If more abnormally terminating tasks remain, the method returns to step 510. Otherwise, the method terminates.

Continuing with the example above, once task 12,345 terminates and generates a core file, the load and increment functions will return core file count 320 values 1 through 1,999,999 for the remaining abnormally terminating tasks in the order that they terminated. Task number 12,345, and the other tasks that receive a core file count 320 value less than 2,048 will generate core files. Tasks that receive a core file count value 320 greater than or equal to the defined threshold 321 of 2,048 will not generate a core file.

In embodiments where the threshold 321 is on a per-node basis, within each of the thousands of nodes, multiple tasks (processes) can be active. In one embodiment, the number of tasks per node can be configured to be 1, 2, 4, 8, 16, 32, or 64. If one task within a node abnormally terminates, it may be desirable to generate core files for all the tasks which abnormally terminate in that node. This may provide a more complete picture of the failure since there is one system/kernel image that supports all the tasks in a given node. Therefore, in such embodiments, the core file count 320 value may be generated per node instead of per task. This may be completed when the first task within a node abnormally terminates. The threshold 321 value is therefore the maximum number of nodes that can create core files, instead of a maximum number of tasks that will generate core files. As long as the abnormally terminated task is executing on a compute node whose sequence number is less than the threshold 321, the task may generate a core file. If the core file count 320 of the compute node is greater than the threshold 321, a core file may not be generated.

A core file count 320 may be specific to a particular job. Once the job completes (normally or abnormally), the core file count 320 values pertaining to that job may be reset or discarded. When a new job, and its corresponding tasks, are issued, a reset core file count 320 value is used along with the threshold 321. The threshold 321 may be the same from job to job, or a different threshold 321 may be defined on a per-job basis.

By limiting the number of core files generated by abnormally terminating tasks in a massively parallel computing system, system resources are preserved and the amount of information users must examine is greatly reduced. In the example above, users may only need to review core files generated by the first 2,048 abnormally terminating tasks, instead of the 2,000,000 tasks that abnormally terminated. Additionally, the sequencing of the tasks which generate core files allows users to identify the tasks which have terminated first.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A parallel computing system, comprising:
a plurality of compute nodes each executing at least one task, of a plurality of tasks, each compute node having at least a processor and a memory, wherein a first compute node, of the plurality of compute nodes, is configured to perform an operation to limit core file generation, by:
upon determining that a first task executing on the first compute node has failed:
performing, by the first task, an atomic load and increment operation on a core file count received from a leader node of the plurality of compute nodes;
generating, by the first task, a first core file upon determining that the core file count is below a predefined threshold; and
not generating, by the first task, the first core file upon determining that the core file count is not below the predefined threshold.

2. The system of claim 1, wherein the predefined threshold specifies a maximum number of core files generated by the plurality of tasks, wherein the core file count specifies a count of tasks, of the plurality, which have generated core files upon failure.

3. The system of claim 1, wherein the predefined threshold specifies a maximum number of compute nodes whose tasks are permitted to generate core files, wherein the core file count specifies a count of compute nodes, of the plurality, executing at least one task which has generated a core file upon failure.

4. The system of claim 1,
wherein the leader node stores the core file count.

5. The system of claim 1, wherein the first core file includes information regarding the internal state of the first task.

6. The system of claim 1, wherein the first core file identifies the first task as a first failing task, of the plurality of tasks.

7. A computer program product to limit core file generation in a massively parallel computing system comprising a plurality of compute nodes each executing at least one task, of a plurality of tasks, the computer program product comprising:
a non-transitory computer-readable storage medium having computer-readable program code embodied therewith, the computer-readable program code comprising:
computer-readable program code configured to, upon determining that a first task executing on a first compute node has failed:
perform, by the first task, an atomic load and increment operation on a core file count received from a leader node of the plurality of compute nodes;
generate, by the first task, a first core file upon determining that the core file count is below a predefined threshold; and
not generate, by the first task, the first core file upon determining that the core file count is not below the predefined threshold.

8. The computer program product of claim 7, wherein the predefined threshold specifies a maximum number of core files generated by the plurality of tasks, wherein the core file count specifies a count of tasks, of the plurality, which have generated core files upon failure.

9. The computer program product of claim 8,
wherein the leader node stores the core file count.

10. The computer program product of claim 8, wherein the first core file includes information regarding the internal state of the first task.

11. The computer program product of claim 8, wherein the first core file identifies the first task as a first failing task, of the plurality of tasks.

12. The computer program product of claim 7, wherein the predefined threshold specifies a maximum number of compute nodes whose tasks are permitted to generate core files, wherein the core file count specifies a count of compute nodes, of the plurality, executing at least one task which has generated a core file upon failure.

* * * * *